Dec. 8, 1970   H. HERRMANN   3,546,649
CONVOLUTED CONDUCTOR ASSEMBLY AND METHOD OF MAKING THE SAME
Filed May 28, 1969

INVENTOR
HELMUT HERRMANN

By: *[signature]*
ATTORNEY

United States Patent Office 3,546,649
Patented Dec. 8, 1970

3,546,649
CONVOLUTED CONDUCTOR ASSEMBLY AND
METHOD OF MAKING THE SAME
Helmut Herrmann, Cologne-Braunsfeld, Germany, assignor to Metalloxyd G.m.b.H., Cologne-Braunsfeld, Germany
Filed May 28, 1969, Ser. No. 828,608
Claims priority, application Germany, May 29, 1968, 1,764,387
Int. Cl. H01f 27/34
U.S. Cl. 336—223
16 Claims

ABSTRACT OF THE DISCLOSURE

A convoluted conductor assembly and a method of making the same. An elongated tape of electrically conductive material is convoluted lengthwise to form a tubular coil. A layer of electrically insulating oxide is formed on at least on major surface of the tape so as to be located between adjacent convolutions of the tape. Opposite longitudinally extending edge portions of the tape, but not of the oxide layer, are bevelled in direction transversely to the elongation of the tape. The end faces and the outer and/or inner circumferential surface of the coil may be coated with electrically insulating material.

BACKGROUND OF THE INVENTION

The present invention relates to convoluted conductor assemblies in general, and more particularly to convoluted conductor assemblies comprising an elongated tape of electrically conductive material provided on at least one major surface thereof with a layer of electrically insulating material. The present invention also relates to a method of making such assemblies.

Convoluted conductor assemblies of the type here under discussion are used in a variety of applications, including in the construction of magnet coils, of coils for use in any electric means or apparatus and of power capacitors or the like. It is already known to make such assemblies by convoluting a strip of aluminum foil which is provided on one major surface thereof with a layer of aluminum oxide, into the shape of a coil. The aluminum oxide layer, which serves for electrically insulating purposes, is usually provided by anodizing the aluminum strip and serves to electrically insulate adjacent convolutions of the aluminum strip from one another. It fulfills this purpose very well, even if it is exceedingly thin, and it is highly resistant and intimately joined to the aluminum strip. Furthermore, the layer of aluminum oxide barely impedes the heat conductivity of the resulting assembly so that heat developing in the conductor assembly during operation of the same can be readily disposed of.

Such convoluted conductor assemblies utilizing aluminum tape with a layer of oxide on one major surface thereof are superior in many respects to conventional wire coils. On the one hand, they can be used at substantially higher temperature ranges than wire coils, and on the other hand they can be wound with a fill factor of 85–95% and they are lighter by almost half than copper wire coils even if one allows for the conductivity factor of aluminum relative to that of copper.

The problem with conductor assemblies manufactured in the above manner is the fact that is frequently occurs that at the edge faces of the resulting coil, where the edges of the aluminum strip and of the layer of oxide are located in a common plane normal to the axis of the coil, shorting or arcing may occur between adjacent convolutions of the aluminum strip and across the interposed layer of oxide. Attempts to avoid this by coating these end faces with an electrically insulating substance have not been entirely successful because the substance sometimes does not adhere properly and because, in any case, the various manufacturing steps necessary to produce a conductor assembly with its end faces thus coated make it very difficult to produce such an assembly in a fully automatic manner but with consistent quality.

SUMMARY OF THE INVENTION

It is, accordingly, an object of the present invention to overcome the aforementioned disadvantages.

More particularly, it is an object of the invention to provide a convoluted conductor assembly of the type under discussion which is not possessed of these disadvantages.

An additional object of the invention is to provide such a conductor assembly which can be produced with constant high quality in a largely automated manner.

An additional object of the invention is to provide such a conductor assembly wherein shorting or arcing at the end faces of the assembly between adjacent convolutions of the strip of electrically conductive material is reliably precluded.

A concomitant object is to provide such a conductor assembly wherein separation of electrically insulating material provided on the end faces of the assembly, is reliably precluded.

A further object of the invention is to provide a method of making such an assembly.

In pursuance of the above objects, and others which will become apparent hereafter, one feature of my invention resides in a method of making convoluted conductor assembly of the type under discussion. My novel method comprises the steps of providing a conductor assembly including an elongated tape of electrically conductive material having on at least one major surface thereof an electrically insulating oxide layer. The opposite longitudinally extending edge portions of only the tape are bevelled in direction transverse to the elongation of the tape, and thereupon the assembly is convoluted lengthwise to form it into a tubular coil.

In other words, once the assembly is convoluted in this manner, the end faces of the coil will no longer have the edges of the oxide layer and the edges of the elongated tape located in a common plane normal to the axis of the coil, but instead the edge faces of the tape will be inclined inwardly, that is in axial direction towards the other end of the coil, whereby the danger of arcing or shorting between adjacent tape convolutions is significantly reduced.

A conductor assembly, according to the present invention and according to the present method, can be produced by mass production methods in a largely automated manner, and this can be done very economically. It is simply necessary, in accordance with a further concept of the invention, to provide an elongated strip of the electrically conductive material. this strip having a width which is a multiple of the width of the tape required for the respective conductor assembly, and to coat at least one major surface of this strip with an electrically insulating oxide layer. Thereupon the strip is severed longitudinally into two or more elongated tapes each having one major surface thereof a layer of the oxide. The bevelling of the opposite longitudinal edge portions of the severed parts of the strip, which are then designated as tapes, is advantageously carried out simultaneously with the severing step so as not to require an additional operating step, and thereupon the tapes each carrying its layer of oxide are advanced to a coil winding apparatus of conventional construction wherein they are convoluted to form tubular coils.

It will be appreciated that rotating cutters, milling tools, stationary cutter knives or band or wire-like grinding tools may be used for the severing step, and these tools will advantageously be provided with a cutting edge which diverges conically in rearward direction, whereby during the severing step the individual tapes produced are automatically provided along their longitudinally extending edges with a bevelled configuration. It is advantageous to effect the severing from that major surface of the strip which is not provided with the layer of oxide because it is then necessary only to sever the strip itself while the hard brittle oxide layer will break by itself along the severing lines.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
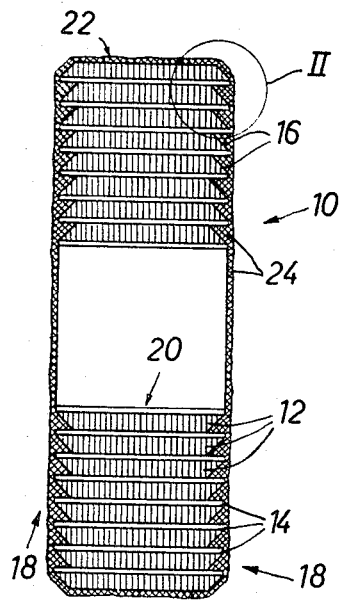
FIG. 1 is a rather diagrammatic cross-section through a conductor assembly according to the present invention.
Figure 2:
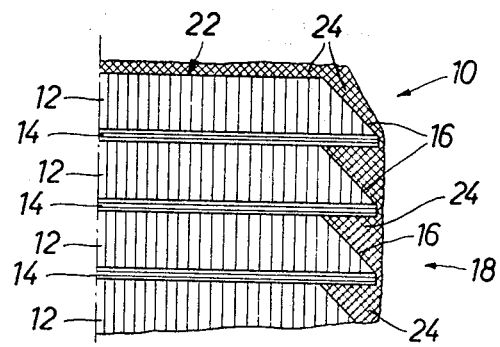
FIG. 2 is a fragmentary detailed view on an enlarged scale of a portion of the conductor assembly shown in FIG. 1.
Figure 5:
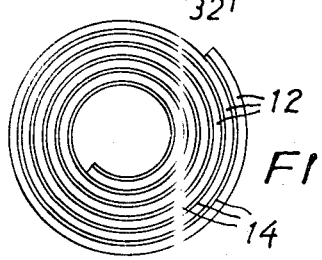
FIG. 5 is an end view of the assembly of FIG. 1 but with the coating of electrically insulating substance omitted in order to show the convoluted or spirally coiled tape with its electrically insulating oxide layer.

Discussing firstly the embodiment illustrated in FIGS. 1, 2 and 5, it will be seen that the convoluted conductor assembly or coil is generally identified with reference numeral 10. It will be seen to comprise an elongated tape 12 of electrically conductive material. Here it shall be assumed that the material of the tape 12 is aluminum, but it is to be understood that other electrically conductive materials may be substituted and that the invention is not to be limited to aluminum. One major surface of the elongated tape 12 is provided with an electrically insulating layer 14 of oxide, here of course aluminum oxide. The layer 14 is usually produced by electrolitic oxidizing of the aluminum tape 12, or of a wider aluminum strip from which the tape 12 is severed. The layer 14 has excellent and intimate adherence to the major surface of the tape 12 and constitutes a very good electrical insulator. Furthermore, it is highly resistant to mechanical and chemical attack and is a good conductor for heat developing within the conductor assembly.

As shown in FIG. 1, and is evident even more clearly from FIG. 2, the longitudinally extending lateral edges of the tape 12 are identified with reference numeral 16 and are bevelled inwardly, that is each edge is bevelled in direction transversely to the elongation of the tape 12 and towards the other edge. It is only the edges of the tape 12 which are bevelled, however, not those of the oxide layer 14. As is clearly evident from FIG. 2, this bevelled configuration of the longitudinal edges of the tape 12 crosses the edge of each convolution of the tape 12 in the assembly 10 to recede inwardly from its associated layer 14 or rather, from its associated convolution of the layer 14, so that there is an axially extending recess or gap provided between adjacent convolutions of the layer 14, and because of this configuration any arcing or shorting between adjacent convolutions of the tape 12 and across the interposed convolution of the layer 14, is significantly reduced or even precluded. This means that even if the assembly is subjected to high voltages, these problems which heretofore have been very bothersome, will no longer occur. The edge faces or end faces of the assembly 10 are identified with reference numeral 18 and it will be seen that in cross-section they have substantially a sawtooth-shaped configuration (compare especially FIG. 2).

If desired, a coating of electrically insulating substance may be provided on the end faces 18, as indicated with reference numeral 24. Because of the recesses in the end faces, created by the bevelling of the longitudinal edge portions of the tape 12, the substance 24 may fill these recesses which results in a considerably improved adhesion of the substance to the assembly. The substance may be a synthetic plastic material, a lacquer or the like known in the art. It has not only the purpose of serving as an electrical insulator, but also serves to reinforce and rigidify the assembly 10.

Furthermore, if desired the inner circumferential surface 20 of the tubular coil or assembly 10 and/or the outer circumferential surface 22 thereof may similarly be coated with the material 24.

It will be appreciated, of course, that it is possible to provide only a thin coating of the material 24 on the end faces 18, that is not to fill the recesses. If so, the recesses of course will remain visible. However, if it is desired that the end faces 18 be planar or substantially planar and smooth, then the recesses will be filled as indicated in FIGS. 1 and 2.

Figure 3:
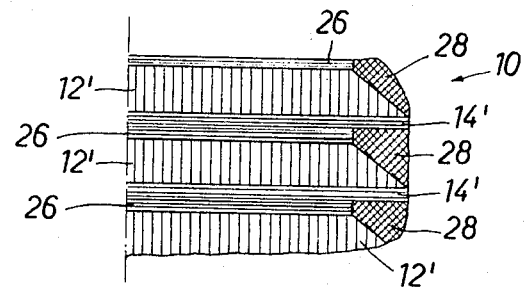
FIG. 3 is a view similar to FIG. 2 but illustrating a further embodiment of the invention.

In the embodiment of FIGS. 1 and 2, only one major surface of the tape 12 is provided with the layer 14. As shown in FIG. 3, however, it is clearly possible to coat both major surfaces of the tape 12 in this manner. In FIG. 3 the tape of electrically conductive material is identified with reference numeral 12′, the layer of oxide corresponding to the layer 14 of FIGS. 1 and 2 is identified with reference numeral 14′, and the additional layer of oxide material, provided on the opposite major surface of the tape 12′, is identified with reference numeral 26. In other respects, the assembly of FIG. 3 is the same as that of FIGS. 1 and 2. Its end faces may again be provided with a coating of electrically insulating substance, here identified with reference numeral 28, and of course the same is true of the inner and/or outer circumferential surfaces of the assembly.

Figure 4:
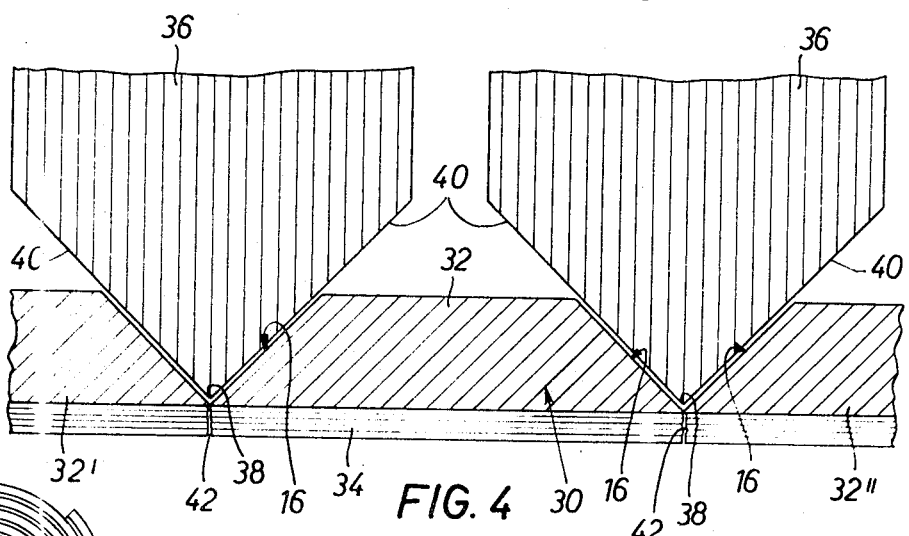
FIG. 4 is a diagrammatic fragmentary illustration of an apparatus for severing a wide strip into a plurality of individual tapes.

FIG. 4, finally, shows an apparatus for making the conductor assembly according to the present invention, and illustrates the method of making the assembly. Reference numeral 30 designates a strip of electrically conductive material, e.g., aluminum, which strip has a width constituting a multiple of the width desired for individual tapes which are to be convoluted into the tubular coils of FIGS. 1–3. One major surface of the strip 30 is provided with a layer 34 of electrically insulating oxide. Severing tools 36 are provided which may be of the types discussed earlier and which have cutting edges 38 diverging in direction rearwardly so as to have inclined side faces 40. These severing tools serve to sever strip 30 with its oxide layer 34 into a plurality of individual tapes 32, 32′ and 32″, each of which of course carries on one major surface thereof a corresponding portion of the oxide layer 34. The width of each of the tapes 32, 32′, 32″ corresponds to the desired axial length of the tubular coil into which it is to be convoluted. Severing of the strip 30 is effected from that major surface thereof which in the illustrated embodiment of FIG. 4 is not provided with the oxide layer 34. Because of the inclined side faces 40 of the severing tools 36, the severing step automatically provides the respective tapes 32, 32′ and 32″ with bevelled longitudinally extending edges 16 corresponding to those shown in FIGS. 1–3. It is not necessary to sever the layer 34, only to sever the strip 30 because the layer 34, which is relatively hard and brittle, will tear or break along the lines 42 in the absence of continued support by the strip 30. In this manner, it is avoided that the cutting edges 38 of the severing tools 36 become damaged by the rather hard oxide layer 34.

Subsequently, the individual tapes 32, 32' and 32" with the portions of the layer 34 adhering thereto, are advanced to conventional non-illustrated coil winding machines where they are wound to resemble the coil shown in FIGS. 1–3. The necessary connections are secured to the coils in known manner.

The insulating substance 24 of FIGS. 1 and 2, or 28 of FIG. 3, is advantageously applied in accordance with the present invention by electrophoretic deposition. Of course, it can also be painted on, applied by dipping, casting or the like. However, electrophoretic deposition has the advantage that faults which may exist in the oxide layer are cured by electrophoretic deposition.

Resort to my invention makes it possible to produce convoluted conductor assemblies which heretofore could not be manufactured because of the limitations of existing methods. Moreover, such assemblies can be produced in a most economical and largely automated manner, and they can be used in applications where heretofore it was necessary to exclusively use wire coils.

It will be understood that each of the elements described above, or two or more together, may also find a useful application in other types of constructions differing from the types described above.

While the invention has been illustrated and described as embodied in a convoluted conductor assembly, it is not intended to be limited to the details shown, since various modifications and structural changes may be made without departing in any way from the spirit of the present invention.

What is claimed as new and desired to be protected by Letters Patent is set forth in the appended claims:

1. A method of making a convoluted conductor assembly, comprising the steps of providing a conductor assembly including an elongated tape of electrically conductive material having on at least one major surface thereof an electrically insulating oxide layer; bevelling the opposite longitudinally extending edge portions of only said tape in direction transverse to the elongation of the latter; and convoluting said conductor assembly lengthwise to thereby form it into a tubular coil.

2. A method as defined in claim 1, wherein said tape is an aluminum tape and said oxide layer is a layer of aluminum oxide.

3. A method as defined in claim 1, wherein the step of providing said conductor assembly comprises forming said layer of oxide on at least one major surface an elongated strip of said electrically conductive material having a width which is a multiple of the width of said tape; and severing said strip and oxide layer lengthwise along at least one severing layer to thereby obtain at least two of said conductor assemblies.

4. A method as defined in claim 3, wherein the step of bevelling said opposite longitudinally extending edge portions is concomitant to the step of severing said strip and oxide layer.

5. A method as defined in claim 4, wherein the step of severing comprises incising said strip with tools having a cutting edge which diverges conically in direction away from said strip.

6. A method as defined in claim 5, wherein the step of severing said strip comprises contacting the other major surface of said strip with the cutting edges of said tools.

7. A method as defined in claim 1; and further comprising the step of coating the end faces of said coil with an electrically insulating substance.

8. A method as defined in claim 7; and further comprising the step of also coating at least one of the inner and outer circumferential surfaces of said tubular coil with an electrically insulating substance.

9. A method as defined in claim 1; and further comprising coating at least some of the exposed surfaces of said tubular coil with an electrically insulating substance.

10. A method as defined in claim 9, wherein the step of coating with an insulating substance comprises electrophoretically depositing said insulating substance on the respective exposed surfaces.

11. A convoluted conductor assembly comprising, in combination, an elongated tape of electrically conductive material convoluted lengthwise in the shape of a tubular coil; an electrically insulating oxide layer on at least one major surface of said tape and electrically insulating adjacent convolutions of said tape from one another, said tape having opposite longitudinally extending edge portions each of which is bevelled in direction transversely to the elongation of said tape.

12. An assembly as defined in claim 11, wherein said material of said tape is aluminum and said oxide is aluminum oxide.

13. An assembly as defined in claim 12; and further comprising a coating of an electrically insulating substance on at least some of the exposed surfaces of said tubular coil.

14. An assembly as defined in claim 13, wherein said coating is on at least one of the inner and outer circumferential surfaces of said tubular coil.

15. An assembly as defined in claim 13, wherein said coating is on at least the end surfaces of said tubular coil.

16. An assembly as defined in claim 13, successive convolutions of said oxide layer defining with one another and with the associated bevelled edge portion of said tape axial recesses in the respective end surfaces of said coil; and wherein said coating covers said end surfaces and fills said recesses.

References Cited
UNITED STATES PATENTS 3,477,126 11/1969 Price _____ 29—605

ELLIOTT A. GOLDBERG, Primary Examiner

U.S. Cl. X.R.

29—605; 317—260